United States Patent
Foster et al.

[11] Patent Number: 6,006,895
[45] Date of Patent: Dec. 28, 1999

[54] CONVEYOR SLAT CONNECTION TO A DRIVE BEAM

[75] Inventors: Raymond Keith Foster, PO Box 1, Madras, Oreg. 97741; James Bradley Fite, Redmond, Oreg.

[73] Assignee: Raymond Keith Foster

[21] Appl. No.: 09/040,655

[22] Filed: Mar. 17, 1998

[51] Int. Cl.⁶ .................................................. B65G 25/00
[52] U.S. Cl. ..................... 198/750.4; 198/750.2
[58] Field of Search .............................. 198/750.1, 750.2, 198/750.3, 750.4, 750.5, 750.6

[56] References Cited

U.S. PATENT DOCUMENTS

| | | | |
|---|---|---|---|
| 4,748,893 | 6/1988 | Foster | 198/750.5 |
| 4,785,929 | 11/1988 | Foster | 198/750 |
| 5,301,798 | 4/1994 | Foster | 198/750 |
| 5,350,054 | 9/1994 | Foster | 198/750 |
| 5,447,222 | 9/1995 | Foster | 198/750 |
| 5,560,472 | 10/1996 | Gist | 198/750.4 X |
| 5,727,672 | 3/1998 | Foster | 198/750 |

*Primary Examiner*—James R. Bidwell
*Attorney, Agent, or Firm*—Delbert J. Barnard

[57] ABSTRACT

A conveyor slat (10) includes a top (12) two laterally spaced apart sidewalls (22, 24), two bottom flanges (26, 28) projecting laterally inwardly from lower portions of the sidewalls (22,24), and a channel space (CS) that is vertically between the top (12) and the bottom flanges (26, 28) and horizontally between the sidewalls (22, 24). A reinforcement insert (38) is positioned within the channel space (CS). The reinforcement insert (38) comprises an elongated body (38) having a top (40), two opposite sidewalls (42, 44) depending from the top (40), a longitudinal channel (45) in the top (40), and an opening (46) in the top communicating with the longitudinal channel (45). The insert (38) is shaped and dimensioned to fit within the channel space (CS) of the conveyor slat (10), horizontally between the two sidewalls (22, 24) of the conveyor slat (10) and vertically between the top (12) and the bottom flanges (26, 28) of the conveyor slat (10). The insert (38) is positioned within the channel space (CS) in the conveyor slat (10). Then, an adhesive is injected through the opening (46) in the top (40) of the insert (38), into the longitudinal channel (45) in the top of the insert. The shallow channel (45) provides for optimum thickness of an adhesive layer. The presence of the sidewalls (42, 44) eliminate the need for clamps to clamp the insert (38) to the conveyor slat (10) while gluing the two together. After the insert (38) is secured to the conveyor slat (10), holes are drilled in the conveyor slat top (12) and the insert top (40) to receive screw fasteners used for securing the reinforced conveyor slat (10, 38) to a connector member (CM) that is attached to the drive beam (48).

16 Claims, 3 Drawing Sheets

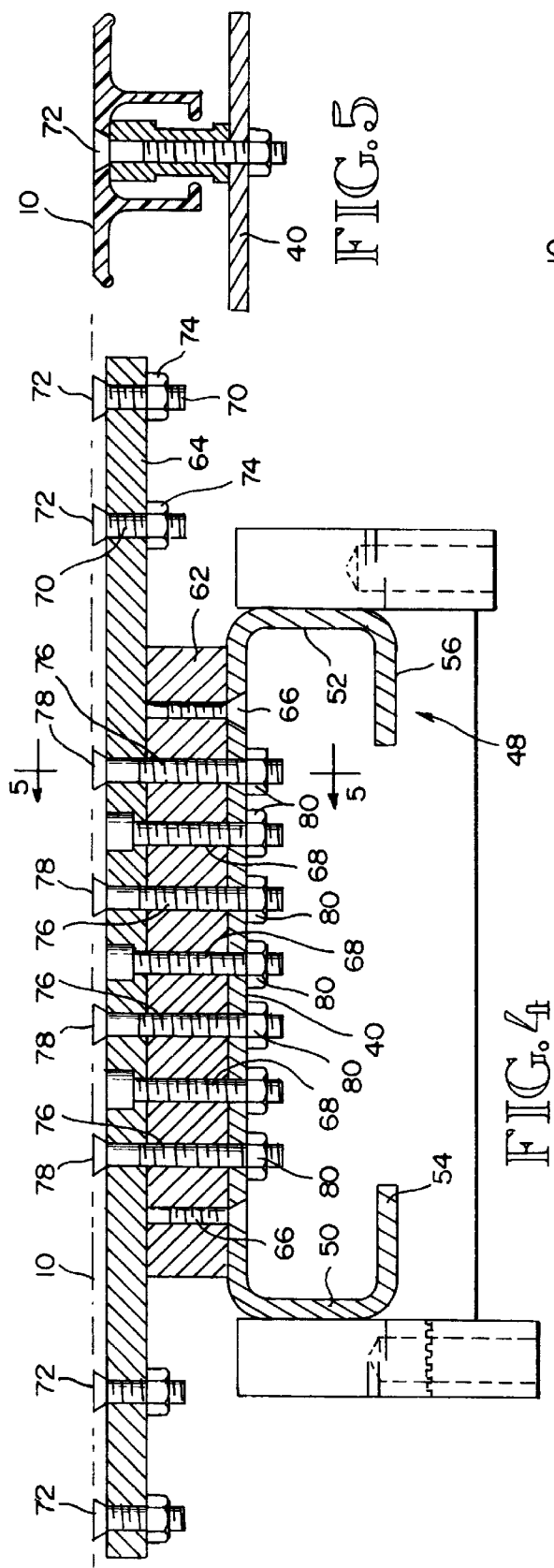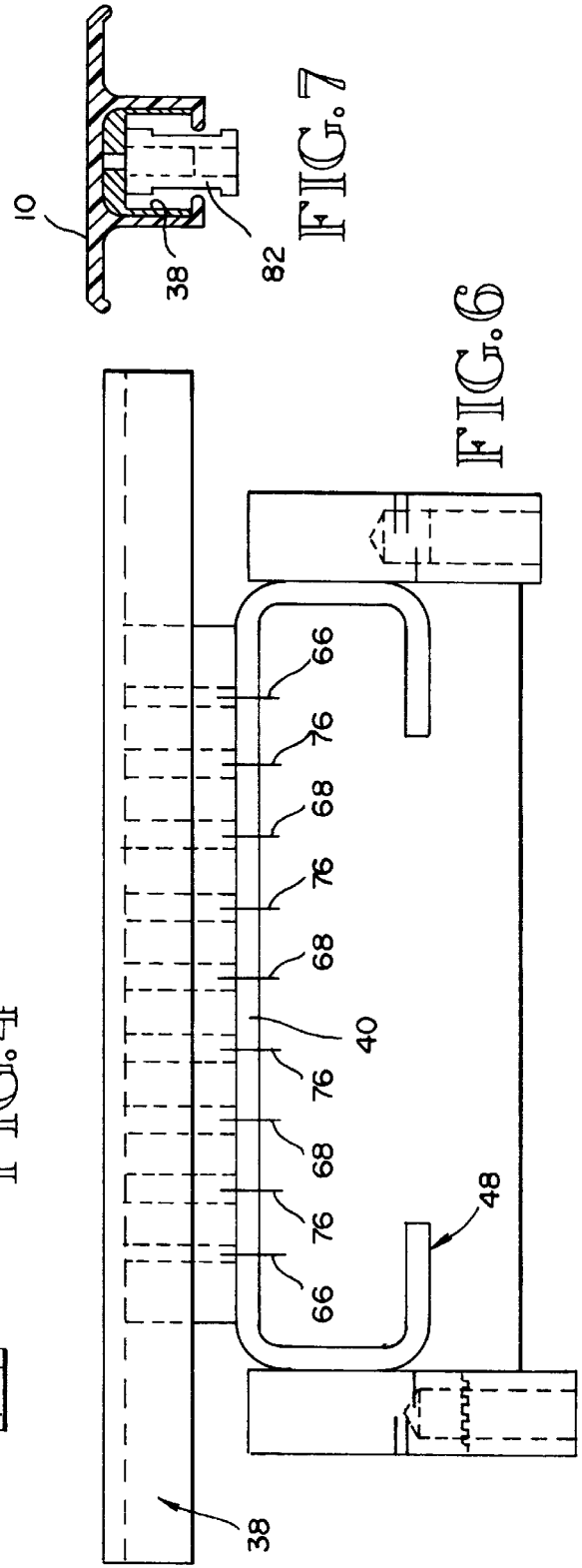

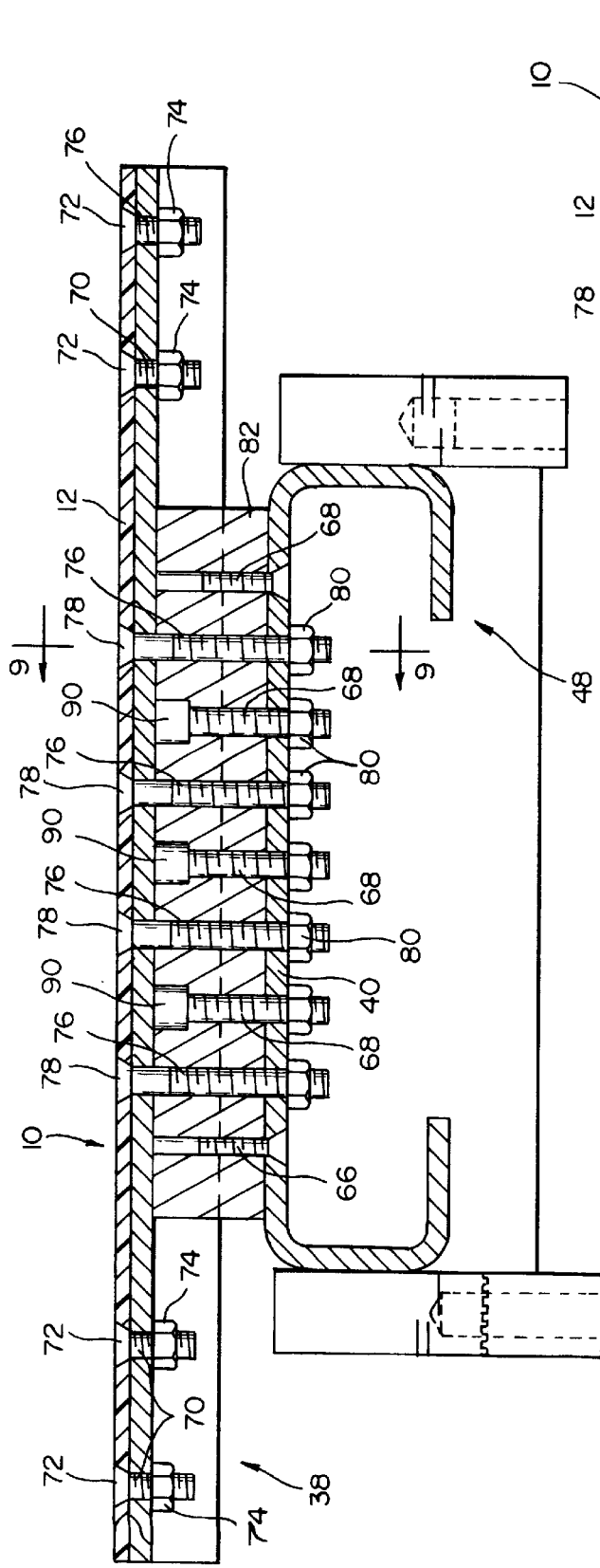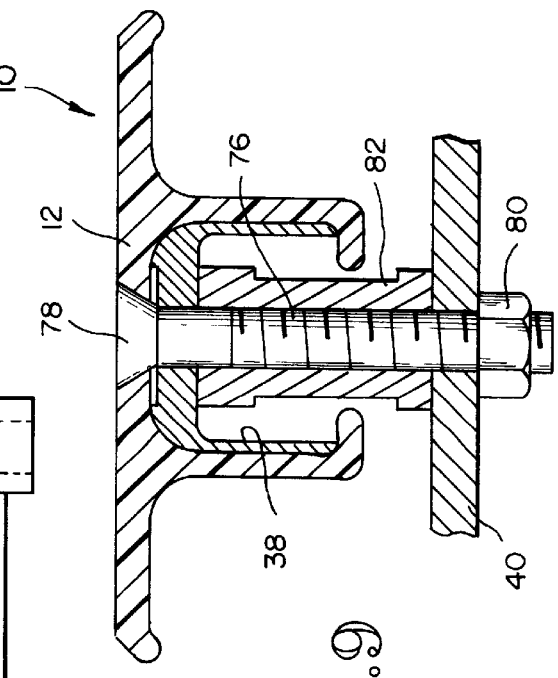

CONVEYOR SLAT CONNECTION TO A DRIVE BEAM

TECHNICAL FIELD

This invention relates to reciprocating slat conveyors. More particularly, it relates to an improved way of connecting the conveyor slats to the transverse drive beams in a reciprocating slat conveyor.

BACKGROUND OF THE INVENTION

Reciprocating slat conveyors comprise a plurality of elongated conveyor slats that are disposed side-by-side and are divided into "sets" and "groups." A typical conveyor includes three sets "1," "2," "3" and at least eight groups. Each group includes a slat from set "1" next to a slat from set "2" that is next to a slat from set "3." All of the set "1" slats are connected to a first transverse drive beam. All of the set "2" slats are connected to a second transverse drive beam. All of the set "3" slats are connected to a third transverse drive beam. Each of the transverse drive beams is connected to a separate hydraulic drive unit. The hydraulic drive units are operated in unison to move the three transverse drive beams, and hence all of the slats, in unison, in a first direction for conveying a load. Then the drive units are operated one at a time in the opposite direction to retract the transverse drive beams one at a time and, hence, retract the conveyor slats one set at a time. Example prior art reciprocating slat conveyors are disclosed by U.S. Pat. No. 4,748,893, granted Jun. 7, 1988, to Raymond Keith Foster, and entitled Drive/Frame Assembly For A Reciprocating Floor, and by U.S. Pat. No. 5,350,054, granted Sep. 27, 1994, also to Raymond Keith Foster, and entitled Ball Block For Mounting Linear Motor.

Prior art conveyor slats are constructed from both plastic and metal. A fiber reinforced plastic slat, formed by pultrusion, is disclosed by U.S. Pat. No. 5,727,672, granted Mar. 17, 1998 to Raymond Keith Foster, and entitled Pultruded Conveyor Slat And Pultrusion Method. Example aluminum slats are disclosed by U.S. Pat. No. 4,785,929, granted Nov. 22, 1988, to Raymond Keith Foster and entitled Bearing System For Reciprocating Floor Conveyor. Example structural plastic slats are disclosed by U.S. Pat. No. 5,447,222, granted Sep. 5, 1995, to Raymond Keith Foster, and entitled Plastic Floor Slat For Reciprocating Conveyor, and by U.S. Pat. No. 5,301,798, granted Apr. 12, 1994, to Arthur L. Wilkins, and entitled Reciprocating Floor Conveyor For Coptic Materials. In the prior art conveyors, the slats are removably connected to the transverse drive beams by use of screw fasteners which extend through the conveyor slats and screw into connector members on the transverse drive beams. A principal object of the present invention is to provide an improved connection between the conveyor slats and the transverse drive beams. The conveyor slat connectors of the present invention are especially useful for connecting plastic or composite conveyor slats to metal connectors.

DISCLOSURE OF THE INVENTION

According to an aspect of the present invention, a conveyor slat is provided that includes a top, two laterally spaced apart sidewalls depending from the top, two bottom flanges projecting laterally inwardly from lower portions of said sidewalls, and a channel space that is vertically between said top and said bottom flanges and horizontally between said sidewalls. A reinforcement insert is provided that comprises an elongated body having a top, two opposite sidewalls depending from said top, a longitudinal channel in said top, and an opening in said top communicating with said longitudinal channel in said top. The insert is shaped and dimensioned to fit within the channel space of the conveyor slat, horizontally between the two sidewalls of the conveyor slat and vertically between the top and bottom flanges of the conveyor slat. The insert is positioned within the channel space in a conveyor slat. Then, an adhesive is injected through the opening in the top of the insert, into the longitudinal channel in the top of the insert, for bonding the insert to the top of the conveyor slat.

In preferred form, the reinforcement insert has upper side portions that are outwardly of the longitudinal channel in the top of the insert. These upper side portions substantially contact upper side portions of the channel space in the conveyor slat when the insert is within the channel space of the conveyor slat. In preferred form, the sidewalls of the reinforcement insert have lower edge portions that contact upper surface portions of the bottom flanges of the conveyor slat when the insert is within the channel space of the conveyor slat.

According to another aspect of the invention, the reinforcement insert can be an elongated bar that is positioned within the channel space in the conveyor slat, between the top of the conveyor slat and a connector member that is connected to the drive beam.

These and other advantages, objects and features will become apparent from the following best mode description, the accompanying drawings, and the claims, which are all incorporated herein as part of the description or disclosure of the invention.

BRIEF DESCRIPTION OF THE DRAWINGS

Like reference numerals are used to designate like parts throughout the several views of the drawing, wherein:

FIG. 4 is a cross-sectional view taken through a transverse drive beam at the location of a connector on a transverse drive beam and through threaded fasteners that are used to connect the conveyor slat to the connector and the transverse drive beam;

FIG. 5 is a sectional view taken substantially along long 5—5 of FIG. 4;

FIG. 6 is a view like FIG. 4 but showing a connector on the transverse drive beam that is positioned within a reinforcement insert of a type shown by FIGS. 1-3, with the threaded fasteners omitted;

FIG. 7 is a view like FIG. 5 but showing the reinforcement insert positioned inside the conveyor slat, with the threaded connector omitted;

FIG. 8 is a view like FIG. 4 but of the assembly shown by FIGS. 6 and 7, showing the threaded fasteners that are used for connecting the conveyor slat to the connector and the transverse drive beam, such view including a phantom line showing of the top portion of the conveyor slat; and FIG. 9 is a sectional view taken along line 9—9 of FIG. 8.

BEST MODE FOR CARRYING OUT THE INVENTION

Figure 1:
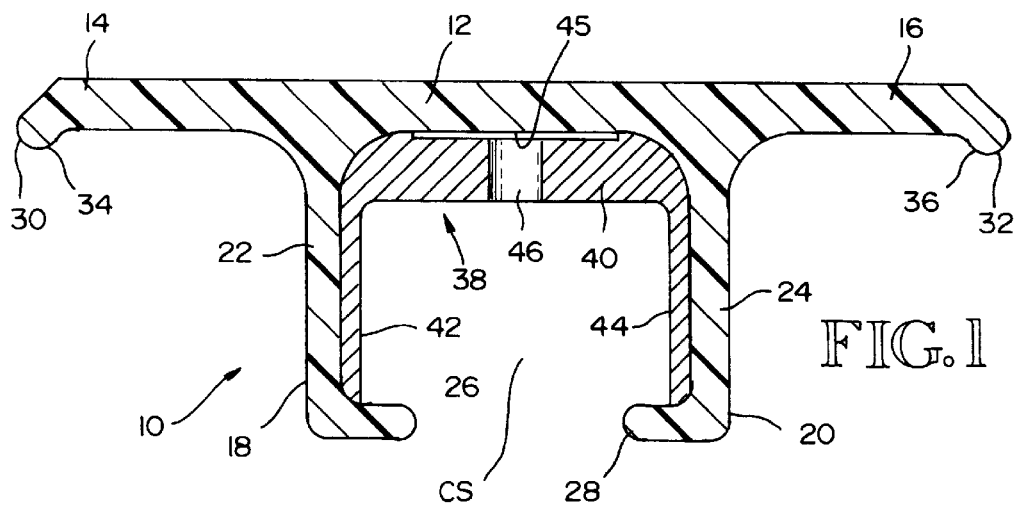
FIG. 1 is a transverse sectional view through a conveyor slat and a reinforcing insert that is positioned within the conveyor slat, such view showing that the insert includes a vertical opening that extends through the top of the insert and communicates with a shallow channel in the top of the insert that extends lengthwise of the insert.

In the preferred embodiment, the conveyor slat 10 has a top 12 including upper side portions 14, 16. Slat 10 also includes lower side portions 18, 20 which include sidewalls 22, 24 and bottom flanges 26, 28. Bottom flanges 26, 28 turn inwardly from the sidewalls 22, 24 in coplanar parallelism. The upper side portions 14, 16 include downwardly extending flanges 30, 32 that include lower edges 34, 36. As disclosed in the aforementioned U.S. Pat. No. 5,727,672, the edges 34, 36 contact and ride on bearing surfaces (not shown).

Figure 2:
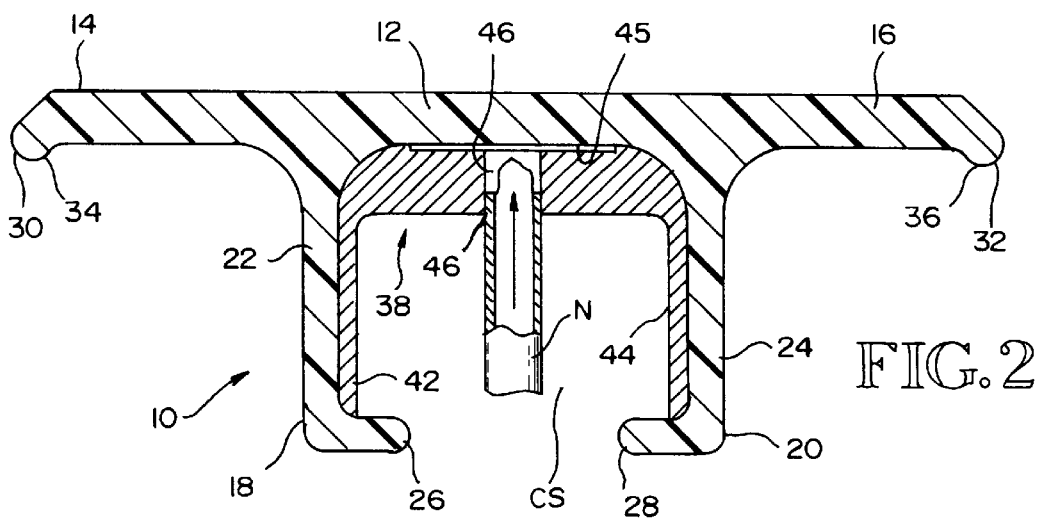
FIG. 2 is a view like FIG. 1, but showing a fragmentary nozzle portion of an adhesive injector that is positioned within the opening in the top of the insert and is being used for injecting an adhesive into the channel that is formed in the top of the insert.
Figure 3:
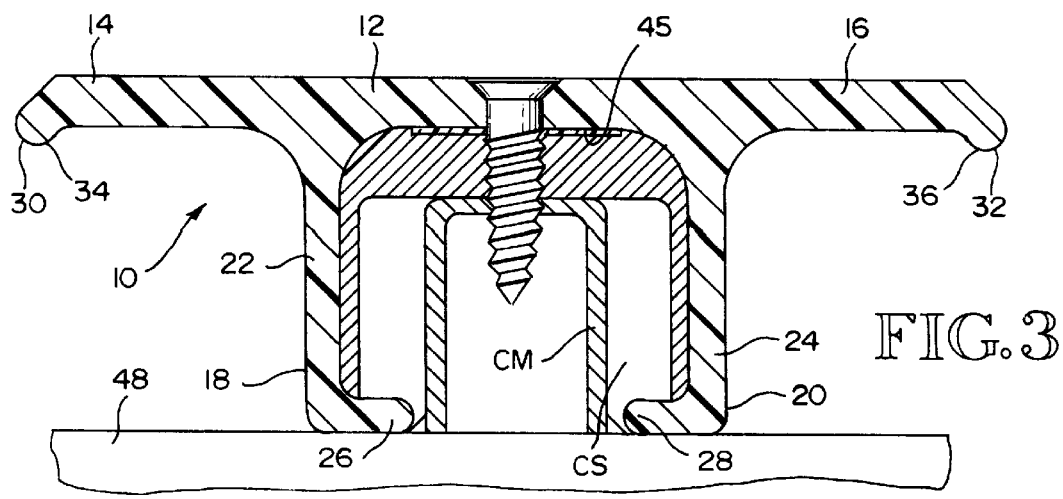
FIG. 3 is a view like FIGS. 1 and 2 but showing the conveyor slat and the reinforcement insert positioned on a connector member or shoe that is secured to the top of a transverse drive beam, such view showing a screw connector used for connecting the conveyor slat to the connector on the transverse drive beam.

Referring to FIGS. 1–3, in accordance with an aspect of the invention, an elongated reinforcement member 38 is positioned within a channel space that is formed by the central portion of the top 12, and by the sidewalls 22, 24 and the flanges 26, 28. The reinforcement member or insert comprises an elongated body 38 having a top 40, two opposite sidewalls 42, 44 depending from the top 40, and an opening 46 in the top 40. As shown by FIGS. 6 and 8, the reinforcement member 38 is longer than the transverse drive beam 48 is wide. By way of typical and therefore nonlimited example, the transverse drive beam 48 may be about ten inches wide and the reinforcement member 38 may be about sixteen inches long.

The drive beam 48 may have a constant cross-sectional configuration. Or, the drive beams 48 may taper as they extend outwardly to their ends, as disclosed in the aforementioned U.S. Pat. No. 4,748,893. Preferably, the drive beams 48 are made from flanged channel stock as shown by FIGS. 4, 6 and 8. Such a drive beam includes the web 40 that forms the top of the drive beam 48, a pair of sidewalls 50, 52 and a pair of flanges 54, 56. This construction leaves an access opening between the flanges 54, 56, for purposes to be described.

Referring to FIG. 2, a reinforcement insert 38 is positioned within the channel space CS of a conveyor slat 10, at the appropriate location. Then, the nozzle N of an adhesive injector is moved upwardly through the channel space CS and inserted into the opening 46. Then, the adhesive injector is operated to force adhesive into an adhesive receiving channel 45 that is formed in the upper portion of the insert top 40, for the full length of the insert 38. The injection of adhesive is continued until adhesive runs out of the two ends of the channel 45. At that time, the injection of adhesive can be stopped.

The positioning of the insert 38 within the channel space CS eliminates the need to clamp the insert 38 to the conveyor slat 10 while bonding the two together. The sidewalls 42, 44 at their lower edges substantially contact the flanges 26, 28. The upper corner portions of the insert 38 substantially contact the upper corner portions of the channel space CS. The introduction of adhesive tends to move the tops 12, 40 apart and move the lower edges of the sidewalls 42, 46 into tight contact with the flanges 26, 28. The depth of the channel 45 is chosen to provide for optimal thickness of the adhesive.

FIGS. 4 and 5 disclose an alternative way of mounting the conveyor slat 10. Here, the connector or shoe 60 is of a two-part connection. The first part 62 is adapted to be connected to the cross drive 48, as will hereinafter be explained. The second part 64 is longer than the first part 62. It is adapted to be connected to both the connector part 62 and the conveyor slat 10. As shown by FIG. 4, openings are formed in the top 40 of the drive beam 48 to receive bolts 66. These bolts 66 are inserted up through the openings in the top 40 and are threaded into tapped openings formed in the connector part 62. Additional openings are drilled for receiving bolts 68. These bolts 68 include cylindrical heads which fit down into wells formed in the connector member 64. The bolts 68 serve to connect the members 62, 64 to the top 40 of the drive beam 48. Next, the conveyor slat 10 is installed. Outwardly of the ends of member 62, the conveyor slat 10 is connected to member 64 by bolts 70. Bolts 70 extend through the top 12 of the conveyor slat 10 and through the member 64. Bolts 70 include countersunk heads 72 that fit down into countersunk openings formed in the conveyor slat top 12. Nuts 74 are attached to complete the fastener assembly 70, 72, 74. Lastly, bolts 76 are attached. They are like bolts 70 but longer. They include heads 78 at their upper ends that are countersunk into the conveyor slat top 10. They also include nuts 80 at the lower ends. The advantage of this arrangement is that more bolts can be used for connecting the connector structure 62, 74 to the drive beam 48 than can be placed in the conveyor slat slot 10. FIG. 4 shows a spacing of the bolt heads 78 which is permissible. It would weaken the conveyor slat top too much to extend the heads of the bolt 68 upwardly through the conveyor slat top.

FIGS. 6 and 7 show essentially the same bolt pattern for the connector system that is shown by FIGS. 1–3, 8 and 9. In FIG. 6, the reference numerals for the bolts 66, 68, 80 are associated with the center lines of the openings that are drilled in the drive beam top 40 and in a connector member 82 that is connected to the drive beam top 40. In FIG. 6, the reinforcement insert 38 is shown but the conveyor slat 10 is not. In FIG. 8, the reinforcement insert 38 is shown in solid lines. The upper surface of the conveyor slat top 12 is shown by a broken or phantom line. In this embodiment, the bolts 66 are used to connect the connector member 82 to the drive beam top 40, as before. In this embodiment, the bolts 68 have their heads 90 countersunk into the member 82. When the nuts 80 on bolts 68 are tightened, they clamp the member 82 tightly to the top 40 of the drive beam 48. Then, the conveyor slat 10 into which a reinforcement insert 38 has been placed and secured, is placed onto the connector member 82. Lastly, the bolts 76 are inserted in place, with their countersunk heads 78 positioned within countersink openings formed in the conveyor slat top 12. When the nuts 74 on bolts 70 are tightened, the conveyor slat 10 is clamped tightly to the reinforcement insert 38. When the nuts 80 on bolts 76 are tightened, the conveyor slat 10 is clamped tightly to both the reinforcement insert 38 and the connector member 82. A very strong and secure connection is provided while keeping the openings in the conveyor slat top 12 sufficiently spaced apart to not weaken the conveyor slat top 12.

The reinforcement insert 38 can be constructed from either metal or a structural plastic. It is preferred that insert 38 be constructed from a pultruded plastic member, constructed by pultrusion in the manner disclosed in the aforementioned U. S. Pat. No. 5,727,672. That is, it is reinforced by fibers extending longitudinally of the insert in a resin matter.

The illustrated embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. For use with a conveyor slat that includes a top, two laterally spaced apart sidewalls depending from the top, two bottom flanges projecting laterally inwardly from lower portions of said sidewalls, and a channel space that is vertically between said top and said bottom flanges and horizontally between said sidewalls, a reinforcement insert comprising:

an elongated body having a top, two opposite sidewalls depending from said top, a longitudinal channel in said top, and an opening in said top communicating with said longitudinal channel in said top, wherein said insert is shaped and dimensioned to fit within the channel space of the conveyor slat, horizontally between the two sidewalls of the conveyor slat and vertically between the top and the bottom flanges of the conveyor slat, and whereby the insert can be positioned within the channel space in a conveyor slat and an adhesive can be injected through the opening in the top of the insert, into the longitudinal channel in the top of the insert, for bonding the insert to the top of the conveyor slat.

2. A reinforcement insert according to claim 1, said insert having upper side portions outwardly of the longitudinal channel in the top of the insert that substantially contact upper side portions of the channel space in the conveyor slat when the insert is within said channel space.

3. The reinforcement insert of claim 2, wherein the sidewalls of the reinforcement insert have lower edge portions that substantially contact upper surface portions of the bottom flanges of the conveyor slat when the reinforcement insert is within the channel space of the conveyor slat.

4. The reinforcement insert of claim 1, wherein the sidewalls of the reinforcement insert have lower edge portions that substantially contact upper surface portions of the bottom flanges of the conveyor slat when the reinforcement insert is within the channel space of the conveyor.

5. For use with a structural plastic conveyor slat that includes a top, two laterally spaced apart sidewalls depending from the top, two bottom flanges projecting laterally inwardly from lower portions of said sidewalls, and a channel space that is vertically between said top and said bottom flanges and horizontally between said sidewalls, a reinforcement insert comprising:

an elongated metal body having a top, two opposite sidewalls depending from said top, a longitudinal channel in said top, and an opening in said top communicating with said longitudinal channel in said top, wherein said insert is shaped and dimensioned to fit within the channel space of the conveyor slat, horizontally between the two sidewalls of the conveyor slat and vertically between the top and the bottom flanges of the conveyor slat, and whereby the insert can be positioned within the channel space in a conveyor slat and an adhesive can be injected through the opening in the top of the insert, into the longitudinal channel in the top of the insert, for bonding the insert to the top of the conveyor slat.

6. A reinforcement insert according to claim 5, said insert having upper side portions outwardly of the longitudinal channel in the top of the insert that substantially contact upper side portions of the channel space in the conveyor slat when the insert is within said channel space.

7. The reinforcement insert of claim 6, wherein the sidewalls of the reinforcement insert have lower edge portions that substantially contact upper surface portions of the bottom flanges of the conveyor slat when the reinforcement insert is within the channel space of the conveyor.

8. The reinforcement insert of claim 5, wherein the sidewalls of the reinforcement insert have lower edge portions that substantially contact upper surface portions of the bottom flanges of the conveyor slat when the reinforcement insert is within the channel space of the conveyor.

9. In combination:

a conveyor slat that includes a top, two laterally spaced apart sidewalls depending from the top, two bottom flanges projecting laterally inwardly from lower portions of said sidewalls, and a channel space that is vertically between said top and said bottom flanges and horizontally between said sidewalls; and a reinforcement insert comprising:

an elongated body having a top, two opposite sidewalls depending from said top, a longitudinal channel in said top, and an opening in said top communicating with said longitudinal channel in said top, wherein said insert is fitted within the channel space of the conveyor slat, horizontally between the two sidewalls of the conveyor slat and vertically between the top and the bottom flanges of the conveyor slat, and whereby an adhesive can be injected through the opening in the top of the insert, into the longitudinal channel in the top of the insert, for bonding the insert to the top of the conveyor slat.

10. The combination of claim 9, wherein said insert having upper side portions outwardly of the longitudinal channel in the top of the insert that substantially contact upper side portions of the channel space in the conveyor slat when the insert is within said channel space.

11. The combination of claim 10, wherein the sidewalls of the reinforcement insert have lower edge portions that substantially contact upper surface portions of the bottom flanges of the conveyor slat when the reinforcement insert is within the channel space of the conveyor slat.

12. The combination of claim 9, wherein the sidewalls of the reinforcement insert have lower edge portions that substantially contact upper surface portions of the bottom flanges of the conveyor slat when the reinforcement insert is within the channel space of the conveyor slat.

13. In combination:

a transverse drive beam including an elongated connector member secured to the drive beam and extending perpendicular to the drive beam;

a plurality of bolts extending through the connector member and the drive beam, for connecting the connector member to the drive beam, said bolts having head portions which are inset into the connector member, below an upper surface on the connector member;

a conveyor slat that includes a top, two laterally spaced apart sidewalls depending from the top, two bottom flanges projecting laterally inwardly from lower portions of said sidewalls, and a channel space that is vertically between said top and said bottom flanges and horizontally between said sidewalls;

a reinforcement insert comprising an elongated body having a top, two opposite sidewalls depending from said top, a longitudinal channel in said top, and an opening in said top communicating with said longitudinal channel in said top;

whereby said insert is fitted within the channel space of the conveyor slat, horizontally between the two sidewalls of the conveyor slat and vertically between the top and the bottom flanges of the conveyor slat;

an adhesive within the longitudinal channel in the top of the insert, serving to bond the insert to the top of the conveyor slat;

said conveyor slat and reinforcement insert being positioned on the connector member, with the connector member extending upwardly into the channel space and contacting the lower surface of the top of the reinforcement insert; and screw fasteners extending through the top of the conveyor slat, the top of the reinforcement insert and through openings in the connector and openings in the top of the drive beam, for connecting the conveyor slat, the reinforcement insert and the connector member to the transverse drive beam.

14. The combination of claim 13, wherein additional screw fasteners connect the top of the conveyor slat to the top of the reinforcement member endwise outwardly of the connector member.

15. In combination:

a transverse drive beam including a first connector member secured to the drive beam and extending perpendicular to the drive beam;

a plurality of bolts extending through the first connector member and the drive beam, for connecting the connector member to the drive beam, said bolts having head portions which are inset into the connector member, below an upper surface on the connector member;

a conveyor slat that includes a top, two laterally spaced apart sidewalls depending from the top, two bottom flanges projecting laterally inwardly from lower portions of said sidewalls, and a channel space that is vertically between said top and said bottom flanges and horizontally between said sidewalls;

an elongated second connector member on top of the first connector member;

said conveyor slat being positioned on the second connector member, with the first and second connector members extending upwardly into the channel space and with the top of the second connector member contacting the top of the conveyor slat; and screw fasteners extending through the top of the conveyor slat, and through openings in the connector members and openings in the top of the drive beam, for connecting the conveyor slat and the connector members to the transverse drive beam.

16. The combination of claim 15, wherein additional screw fasteners connect the top of the conveyor slat to the second connector member endwise outwardly of the connector member.

* * * * *